United States Patent
Markert

(10) Patent No.: US 11,685,199 B2
(45) Date of Patent: Jun. 27, 2023

(54) TIRE PRESSURE SENSOR AND ARRANGEMENT WITH A TIRE VALVE AND A TIRE PRESSURE SENSOR

(71) Applicant: TireCheck GmbH, Heidenheim (DE)

(72) Inventor: Christian Markert, Herbrechtingen (DE)

(73) Assignee: TIRECHECK GMBH, Heidenheim (DE)

( * ) Notice: Subject to any disclaimer, the term of this patent is extended or adjusted under 35 U.S.C. 154(b) by 86 days.

(21) Appl. No.: 17/015,215

(22) Filed: Sep. 9, 2020

(65) Prior Publication Data
US 2021/0070118 A1 Mar. 11, 2021

(30) Foreign Application Priority Data
Sep. 10, 2019 (DE) .......................... 102019213714.8

(51) Int. Cl.
*B60C 23/04* (2006.01)

(52) U.S. Cl.
CPC ................................ *B60C 23/0494* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003;
(Continued)

(56) References Cited

U.S. PATENT DOCUMENTS

| 4,823,835 A | 4/1989 | Chu |
| 5,665,908 A | 9/1997 | Burkey et al. |

(Continued)

FOREIGN PATENT DOCUMENTS

| CN | 201856591 | 6/2011 |
| DE | 102014205923 | 10/2015 |

(Continued)

*Primary Examiner* — Andre J Allen
(74) *Attorney, Agent, or Firm* — Faegre Drinker Biddle & Reath LLP

(57) ABSTRACT

The invention relates to a tire pressure sensor that includes a pressure transducer, a transmitter, and a housing carrying the pressure transducer and the transmitter, adapted to be mounted to an air inlet end of a tire valve; wherein the housing has a sleeve part which has an internal thread at the end for screwing the sleeve part onto the tire valve. The tire pressure sensor according to the invention is characterized in that the housing further has a receiving part in or on which the pressure sensor and the transmitter are arranged and which, in the mounted state, is connected to the sleeve part so as to be rotatable relative to the sleeve part.

20 Claims, 2 Drawing Sheets

(58) Field of Classification Search
CPC .......... B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/044; B60C 23/00; B60C 23/008; B60C 23/0455; B60C 23/0454; B60C 23/0461; B60C 238/0483; B60C 23/0474; B60C 23/0415; B60C 23/0491; B60C 23/0489; B60C 25/002; B60C 29/064; B60C 23/00363; B60C 23/0471; B60C 11/0318; B60C 23/0459; B60C 23/0481; B60C 2019/005; B60C 23/002; B60C 23/042; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 19/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC ................................................. 73/146–146.8
See application file for complete search history.

(56) References Cited

U.S. PATENT DOCUMENTS

| | | | |
|---|---|---|---|
| 6,167,900 B1 | 1/2001 | Laird | |
| 7,421,902 B2 | 9/2008 | Sheikh-Bahaie | |
| 9,796,221 B2 | 10/2017 | Biegner et al. | |
| 10,661,614 B2 | 5/2020 | Kisker et al. | |
| 10,814,682 B2* | 10/2020 | Seifert | B60C 23/0494 |
| 2007/0113637 A1* | 5/2007 | Blossfeld | B60C 23/0494 73/146.8 |
| 2008/0110267 A1 | 5/2008 | Sheikh-Bahaie | |
| 2013/0340516 A1* | 12/2013 | Hettle | B60C 23/0408 137/15.18 |
| 2014/0196812 A1* | 7/2014 | Musgrave | B60C 23/00318 152/417 |
| 2018/0119834 A1* | 5/2018 | Johnson | F16K 15/20 |
| 2020/0324589 A1* | 10/2020 | Luo | B60C 29/005 |

FOREIGN PATENT DOCUMENTS

| | | |
|---|---|---|
| DE | 102017128466 | 6/2019 |
| FR | 2992258 | 12/2013 |

* cited by examiner

TIRE PRESSURE SENSOR AND ARRANGEMENT WITH A TIRE VALVE AND A TIRE PRESSURE SENSOR

CROSS-REFERENCE TO RELATED APPLICATION

The present application claims priority to DE 102019213714.8, filed Sep. 10, 2019, the entire disclosure of which is hereby expressly incorporated herein by reference.

The present disclosure relates to a tire pressure sensor and an arrangement comprising a tire valve and a tire pressure sensor.

BACKGROUND/SUMMARY

Vehicle wheels, in particular motor vehicle wheels, have a rim, usually made of steel or aluminum or an aluminum alloy, onto which a tire is mounted. In order to fill the interior space between tire and rim, in this case called tire cavity, with compressed air, a tire valve is provided which is inserted through the rim base of the vehicle rim so that it is arranged with its air outlet end inside the tire cavity and is accessible at its air inlet end from outside the vehicle wheel. A compressed air source can then be connected to the air inlet end, which presses a non-return valve inside the tire valve, so that compressed air flows from the compressed air source into the tire cavity. When the compressed air source is removed, the non-return valve prevents the tire cavity from emptying via the tire valve.

In practice, the air pressure in the tire cavity is increasingly monitored by a tire pressure sensor. Usually, the tire pressure sensor is located inside the tire cavity, has a pressure transducer and a transmitter and transmits pressure values recorded by the pressure transducer to a receiver in the vehicle.

However, solutions are also known for truck tire valves, as the present disclosure particularly relates to, in which the tire pressure sensor is screwed onto the air inlet end of the tire valve outside the tire cavity and records the air pressure in the tire valve. For this purpose, the tire pressure sensor has a sleeve part which is screwed directly onto the tire valve, thereby opening the non-return valve in the tire valve so that the air pressure from the tire valve spreads into the sleeve part. In order to avoid unwanted ventilation of the tire cavity, the sleeve part is equipped with a non-return valve, so that the interior of the sleeve part, which is filled with compressed air, is sealed against the environment. The air pressure inside the interior of the sleeve part is then measured by a pressure transducer of the tire pressure sensor. Analogous to the sensors positioned inside the tire cavity, the tire pressure sensor also has a transmitter which sends the pressure detected by the pressure transducer to a receiver on the vehicle side.

Especially on truck wheels, tire valves are often angled so that their stem extends parallel to the rim surface. If the tire pressure sensor is now screwed onto the tire valve with its sleeve part, it must be rotated around its longitudinal axis, which extends in the axial direction of the air inlet end of the tire valve. In addition, the distance between the valve stem and the parallel surface of the rim limits the outer diameter of the tire pressure sensor.

Due to the limited space available, well-known tire pressure sensors, which are screwed onto the air inlet end of a tire valve, are comparatively long and are designed with a small diameter. The components of the tire pressure sensor are distributed as evenly as possible around the longitudinal axis to achieve this.

The disadvantage is that the tire pressure sensor thus extends very far to the lateral end of the rim or even beyond it, and the possibility of positioning the necessary components within the tire pressure sensor is also limited.

U.S. Pat. No. 6,167,900 B1 discloses a tire valve with externally arranged O-rings over which the sleeve of a tire pressure sensor can be slid, wherein the sleeve is clamped between a collar of the tire valve and a nut screwed onto the tire valve.

U.S. 2008/0110267 A1 discloses a further arrangement of a housing of a tire pressure sensor on a tire valve, wherein the housing is also clamped on the tire valve.

U.S. Pat. No. 5,665,908 A discloses a venting device for a tire.

DE 10 2017 128 466 A1 discloses another tire pressure sensor that is mounted on a tire valve secured against rotation.

CN 201856591 U and U.S. Pat. No. 7,421,902 B2 disclose a tire pressure sensor bolted to a tire valve.

DE 10 2014 205 923 A1 discloses the jamming of a tire pressure sensor on a curved tire valve.

For further information relating to the prior art, reference is hereby made to FR 2 992 258 A1 and U.S. Pat. No. 4,823,835 A.

The present disclosure is based on the object of specifying a tire pressure sensor of the type shown at the beginning, which is attached outside the tire cavity to the air inlet end of the tire valve, allowing a flexible design in the arrangement of the components, such as pressure transducer and transmitter and in particular an electrical energy storage device and a control device within the tire pressure sensor.

The object according to the disclosure is solved by a tire pressure sensor having the features of claim 1. In the dependent claims, advantageous and particularly expedient designs of the disclosure and an arrangement with a tire valve and a tire pressure sensor are indicated.

A tire pressure sensor according to the disclosure, which, in contrast to tire pressure sensors arranged in the tire cavity, is attached to the tire valve outside of the tire cavity during intended use, as described above, has at least one pressure transducer, a transmitter and a housing carrying the pressure transducer and the transmitter. In principle, the transmitter and/or the pressure transducer could be positioned on the housing in such a way that they are not completely enclosed by the housing, i.e. they are attached to the outside of a housing area. Preferably, however, the housing completely encloses the transmitter and/or the pressure transducer and has a corresponding interior space in which the pressure transducer and/or the transmitter are positioned, in particular together with an energy storage device and a control device.

According to the disclosure, the housing is designed to be attached to an air inlet end of a tire valve. For example, the housing is attached to the tire valve at a point where a valve cap is screwed on without the tire pressure sensor. The valve cap can be unscrewed accordingly and the tire pressure sensor can be screwed onto the tire valve at its air inlet end instead of the valve cap. In principle, other solutions are possible, such as providing an intermediate part or extension on the tire valve and screwing the tire pressure sensor onto this component.

According to the disclosure, the housing has a sleeve part and a receiving part. The sleeve part has an internal thread at the end for (at least indirectly) screwing the sleeve part onto the tire valve. The receiving part is arranged to carry the pressure sensor and the transmitter. Accordingly, the pressure transducer and the transmitter are arranged in or on the receiving part, depending on whether the pressure transducer and the transmitter are completely enclosed by the receiving part.

According to the disclosure, the receiving part is connected to the sleeve part in the assembled state so that it can be rotated relative to the sleeve part.

The disclosure allows the sleeve part to be screwed onto the tire valve without having to twist the receiving part for the pressure transducer and the sensor as well. Accordingly, the receiving part can be designed with a comparatively large diameter, since it no longer has to extend concentrically to the sleeve part. The diameter of the receiving part can be larger than the distance of the tire valve stem from the rim over a circumferential section of the receiving part.

Preferably, the receiving part partially or completely encloses the sleeve part in the circumferential direction and is supported by the sleeve part so that it can be rotated around the sleeve part.

The receiving part is preferably arranged eccentrically to the axis of rotation and to the sleeve part in order to make maximum use of the above-mentioned advantages.

Preferably, an electrical energy storage device and a control device are also arranged on or in the receiving part, wherein the control device is supplied with electrical energy from the electrical energy storage device and controls the pressure transducer and the transmitter. In particular, the pressure transducer and the transmitter are also supplied with electrical energy by the electrical energy storage device.

As explained, the receiving part may have at least one interior space in which the pressure transducer and the transmitter and in particular the energy storage device and the control device are positioned completely enclosed by the material of the receiving part.

According to a particularly preferred design of the disclosure, the sleeve part has an air duct extending through the sleeve part in the axial direction of the sleeve part, which air duct comprises an outlet at a first axial end at which the internal thread is arranged and an inlet at a second axial end opposite to the first axial end. A non-return valve is provided in the area of the inlet, which shuts off the air duct in a pressure-tight manner. The sleeve part thus assumes the function of the conventional tire valve when the sleeve part is screwed onto the tire valve.

In order to keep the non-return valve, which is conventionally provided in the tire valve, permanently in an open position, so that the air duct of the sleeve part is pressurized with the compressed air from the tire and in order to be able to measure the air pressure in the sleeve part with the transducer, the sleeve part preferably has an internal projection in the area of the outlet, which at least protrudes into the internal thread. This inner projection is thus pressed into the tire valve when the sleeve part is screwed onto the air inlet end of the tire valve and pushes the non-return valve provided there into the open position and holds it in this open position.

The receiving part includes, for example, at least one radial bore, which is connected to the pressure transducer in a way that allows compressed air to pass through it on the one hand and to the air duct in the sleeve part in a way that allows compressed air to pass through it on the other.

Preferably, the sleeve part has an outer surface which is opposite to an inner surface of the receiving part and along which the receiving part can be rotated around the sleeve part in circumferential direction to the axial direction. The sleeve part can then have at least one radial bore, which opens into the air duct and on the outer surface or in a circumferential groove provided in the outer surface.

The radial bore in the receiving part opens preferably on the inner surface of the receiving part or in a circumferential groove provided therein.

The sleeve part can be provided with at least one external drive, for example an external hexagon, for the form-fitting engagement of a tool. This allows the frictional forces that arise when the sleeve part is screwed onto the tire valve and is twisted in relation to the receiving part, especially within the receiving part, to be easily overcome.

According to one embodiment of the disclosure, such an external drive, for example an external hexagon, is provided at the inlet end of the sleeve part. Another embodiment of the disclosure provides that a corresponding external drive, for example an external hexagon, is provided at the outlet end of the sleeve part. Both embodiments can also be combined with each other.

It is particularly preferred that the sleeve part has an external thread at its axial end facing away from the internal thread, i.e. at the inlet end, for screwing on a valve cap. This means that the valve cap previously screwed onto the tire valve can preferably be unscrewed from the tire valve, then the tire pressure sensor can be screwed onto the tire valve and the valve cap can be screwed onto the tire pressure sensor or the sleeve part of the tire pressure sensor.

In an arrangement according to the disclosure with a tire valve and a tire pressure sensor, the tire valve has an air inlet end and an opposite air outlet end. The air outlet end is arranged to be positioned within a tire cavity. The tire valve comprises a valve stem extending from the air inlet end to the air outlet end and is designed to be inserted through and retained by a vehicle rim. The tire pressure sensor is attached to the air inlet end of the tire valve, especially screwed onto it.

In particular, the valve stem can be bent, for example with an arc between 70° and 100°, preferably with an arc of 90°.

When the sleeve part is inserted through the receiving part, it is advantageous for the sleeve part to be sealed airtight against the receiving part, for example with sealing rings such as O-rings. This allows the interface through which the air pressure from the sleeve part, especially its air duct, is conducted into the receiving part and to the pressure sensor, to be sealed against the environment.

BRIEF DESCRIPTION OF THE DRAWINGS

The disclosure will be described in the following with the help of an exemplary embodiment and the figures, wherein.

DETAILED DESCRIPTION

Figure 1:
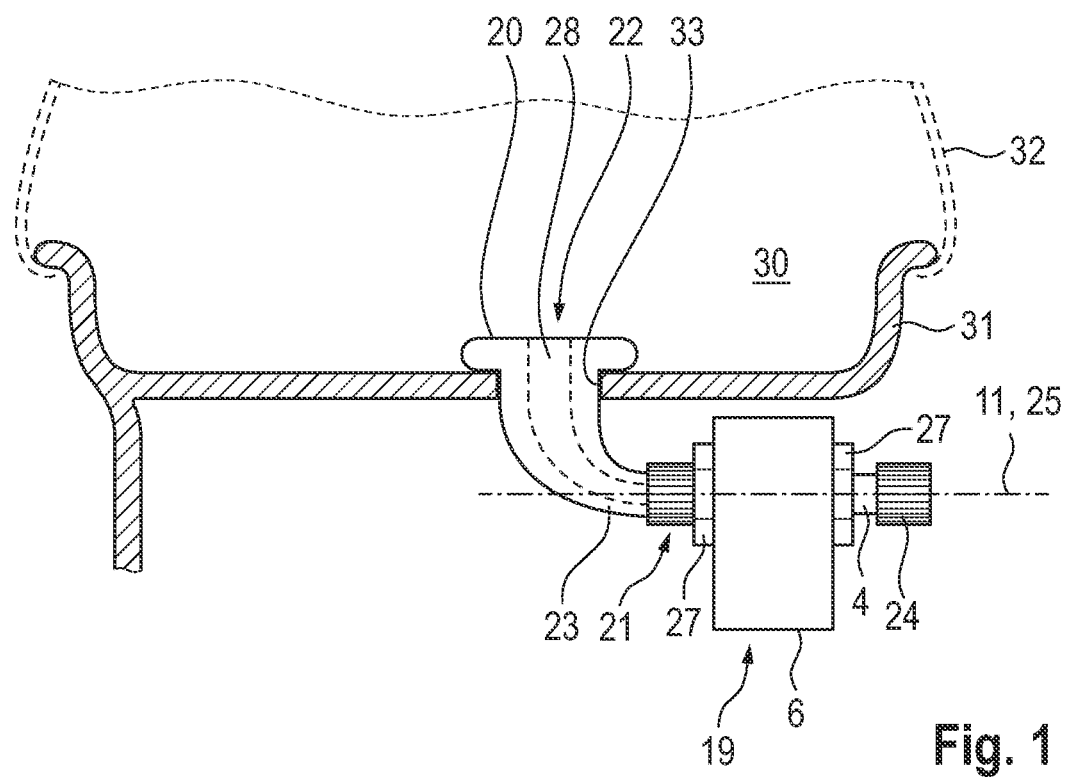
FIG. 1 shows an arrangement according to the disclosure comprising a tire valve and a tire pressure sensor mounted on a vehicle rim.

FIG. 1 schematically shows a vehicle rim 31, which together with a merely indicated tire 32 encloses a tire cavity 30 sealed from the environment. The vehicle rim 31 has a hole 33, here a radial hole, into which a tire valve 20 is inserted which is sealed against the vehicle rim 31.

The tire valve 20 has a valve stem 23 with an air inlet end 21 and an air outlet end 22. In this case, the terms inlet and outlet always refer to a direction of flow that occurs when the tire 32 is inflated, i.e. the tire cavity 30 is filled with compressed air via the tire valve 20. A valve cap 24 can be screwed onto the air inlet end of such a tire valve 20. According to the disclosure, however, a tire pressure sensor 19 is screwed onto the air inlet end 21 instead of the valve cap 24. The valve cap 24, however, is screwed back onto the inlet 14 of a sleeve part 4 of the tire pressure sensor 19.

The valve stem 23 encloses a duct 28, which connects the tire cavity 30 to the air inlet end 21 of the tire valve 20 in a pressure-tight manner. As explained below in closer detail, the air inlet end 21 is closed off in a pressure-tight manner by means of a non-return valve 26 if a valve body of the non-return valve 26 is not lifted from the valve seat because the pressure in the tire cavity 30 and thus in the air outlet end 22 is higher than the pressure at the air inlet end 21.

The valve stem 23 is formed in a bent manner, here it is angled at 90°. Therefore, the air inlet end 21 extends along an axial direction 11, which is parallel to the radially inner surface of the vehicle rim 31 and to an axis of rotation of the tire 32.

The sleeve part 4 of the tire pressure sensor 19 can be rotated about an axis of rotation 25, which coincides with the axial direction 11, to be screwed onto the air inlet end 21 of the tire valve 20.

In addition to the sleeve part 4, the tire pressure sensor 19 also has a receiving part 6 that can be rotated relative to the sleeve part 4 so that the sleeve part 4 can be screwed onto the tire valve 20 without rotating the receiving part 6. Therefore, the receiving part 6 can be designed with a comparatively large diameter at least in the circumferential section which is not directly opposite the radially inner surface of the vehicle rim 31.

To facilitate the screwing of the sleeve part 4 onto the tire valve 20, external drives 27 are provided on the sleeve part 4, here one external drive 27 on each axial side of the receiving part 6. However, one external drive 27 could also be sufficient or both external drives 27 could be omitted.

For example, the external drive(s) 27 is/are designed in the form of an external hexagon on which a wrench or socket (a "nut") of a screwdriving tool can be placed.

Figure 2:
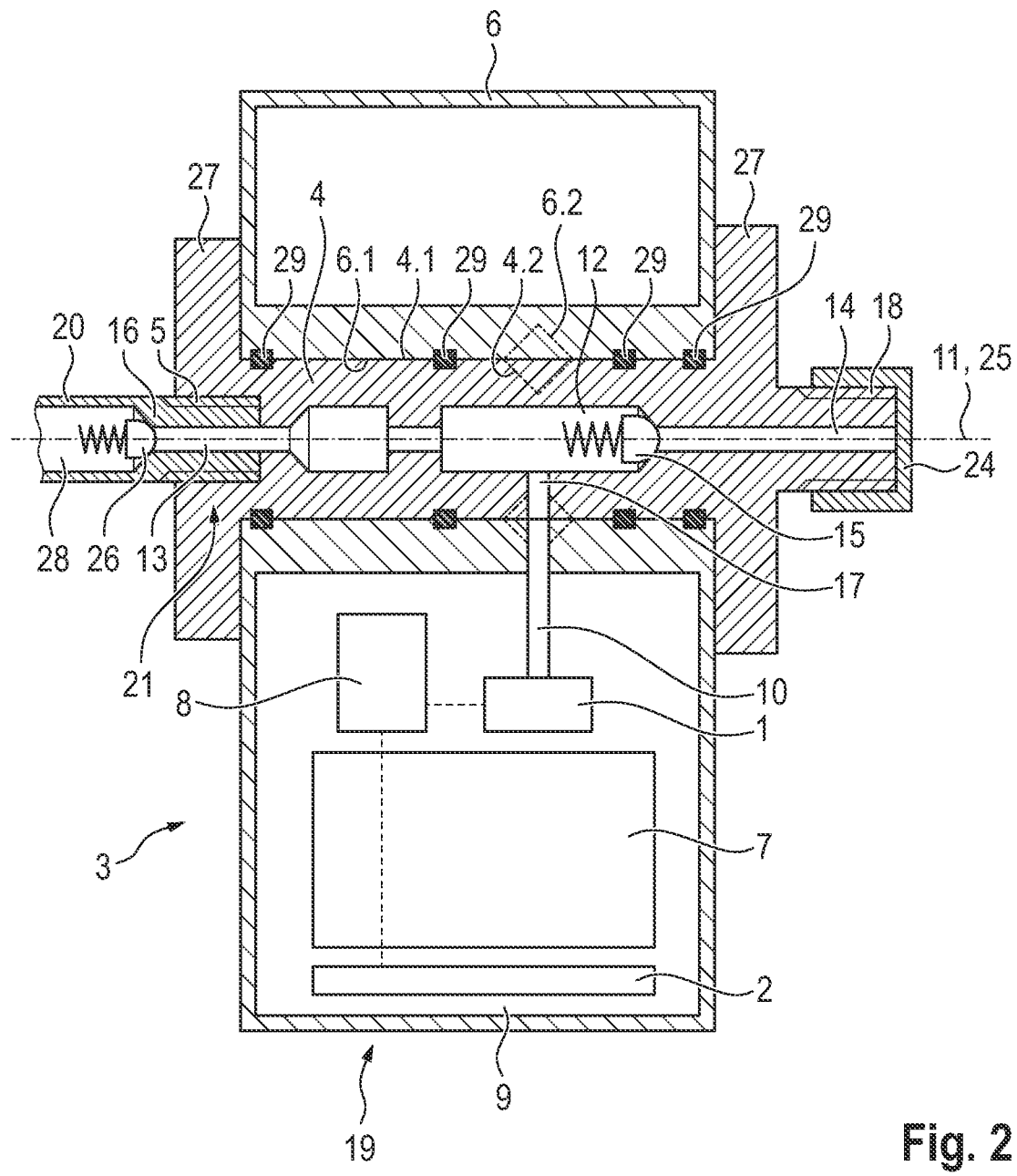
FIG. 2 shows a schematic axial section through the tire pressure sensor from FIG. 1.

The structure of the tire pressure sensor 19 is better shown in FIG. 2. In this figure, the same reference numerals as in FIG. 1 are used for the corresponding components. It can be seen that the receiving part 6 has a radially inner surface 6.1 which encloses a radially outer surface 4.1 of the sleeve part. Both surfaces 4.1, 6.1 are sealed against each other by sealing rings 29.

The receiving part 6 has an internal thread 5 in the area of one axial end, with which it is screwed onto a corresponding external thread of the tire valve 20. In the area of this external thread of the tire valve 20 at its air inlet end 21, the previously mentioned non-return valve 26 is also provided, which is pressed into a closed position by a spring force.

To hold the non-return valve 26 in its open position, the receiving part 6 has an internal projection 16 which protrudes into the air inlet end 21 of the tire valve 20 and pushes the non-return valve 26 into its open position. This allows compressed air to flow from the tire valve 20 or its duct 28 into the air duct 12 of the sleeve part 4. The air duct 12 has an inlet 14 at its axial end facing away from the tire valve 20, as well as an outlet 13 at its axial end facing the tire valve 20. This allows the tire to be inflated with compressed air, as with a conventional tire valve 20. Correspondingly, a non-return valve 15 is also provided in the area of the inlet 14, which seals the inlet 14 against an outflow of air.

The valve cap 24 is also screwed onto the inlet 14. For this purpose, the sleeve part 4 is provided with an external thread 18.

From the air duct 12, the air pressure is conducted to the pressure transducer 1 via at least one radial bore 17 in the sleeve part 4 and at least one radial bore 10 in the receiving part 6. In order to establish a secure connection conducting the compressed air in any rotational position of the receiving part 6 with respect to the sleeve part 4, a circumferential groove 4.2 can be provided in the radially outer surface 4.1 of the sleeve part 4. Additionally or alternatively, a circumferential groove 6.2 can be provided in the radially inner surface 6.1 of the receiving part 6.

The pressure transducer 1 accordingly detects the pressure in the air duct 12, wherein this pressure corresponds to the pressure in duct 28 of the tire valve 20 and this pressure in turn corresponds to the pressure in the tire cavity 30, apart from pressure losses. Thus, the pressure transducer 1 at least indirectly detects the pressure in the tire cavity 30.

A control device 8 is set up and connected to the pressure transducer 1 and a transmitter 2 in order to send the pressure detected by the pressure transducer 1 via the transmitter 2 to a receiver in a vehicle or also to a hand-held receiver.

An electrical energy storage 7 is provided for the energy supply.

The tire pressure sensor 19 according to the disclosure thus comprises, as shown, a housing 3, which has both the sleeve part 4 and the receiving part 6 and accommodates all important components for tire pressure measurement. In the exemplary embodiment shown, the receiving part 6 has an interior space 9 completely enclosed by the receiving part 6, in which the pressure transducer 1, the transmitter 2, the control device 8 and the electrical energy storage device 7 are arranged. The interior space 9 could also be designed in several parts and/or accommodate further components, in particular electronic components, for example a circuit board on which the components are arranged.

REFERENCE NUMERALS

1 Pressure transducer
2 Transmitter
3 Housing
4 Sleeve part
4.1 Outer surface
4.2 Circumferential groove
5 Internal thread
6 Receiving part
6.1 Inner surface
6.2 Circumferential groove
7 Electrical energy storage device
8 Control device
9 Interior space
10 Radial bore
11 Axial direction
12 Air duct
13 Outlet
14 Inlet
15 Non-return valve
16 Internal projection
17 Radial bore
18 External thread
19 Tire pressure sensor
20 Tire valve
21 Air inlet end
22 Air outlet end
23 Valve stem
24 Valve cap
25 Axis of rotation
26 Non-return valve 27 External drive
28 Duct
29 Sealing ring
30 Tire cavity
31 Vehicle rim
32 Tires
33 Hole

The invention claimed is:

1. Tire pressure sensor
comprising a pressure transducer, a transmitter, and a housing supporting the pressure transducer and the transmitter and adapted to be attached to an air inlet end of a tire valve; wherein
the housing has a sleeve part which has an internal thread at the end for screwing the sleeve part onto the tire valve;
wherein
the housing further comprises a receiving part in which or on which the pressure transducer and the transmitter are arranged and which in the mounted state is connected to the sleeve part so as to be rotatable relative to the sleeve part.

2. Tire pressure sensor according to claim 1, wherein the receiving part partially or completely surrounds the sleeve part in the circumferential direction and is supported by the sleeve part so as to be rotatable about the sleeve part.

3. Tire pressure sensor according to claim 2, wherein the receiving part is arranged eccentrically to the axis of rotation and to the sleeve part.

4. Tire pressure sensor according to claim 1, wherein an electrical energy storage device and a control device are also arranged on or in the receiving part, wherein the control device is supplied with electrical energy from the electrical energy storage device and controls the pressure transducer and the transmitter.

5. Tire pressure sensor according to claim 1, wherein the receiving part has at least one interior space in which the pressure transducer and the transmitter and in particular the energy storage device and the control device are positioned completely enclosed by the receiving part.

6. Tire pressure sensor according to claim 1, wherein the sleeve part has an air duct extending through the sleeve part in the axial direction of the sleeve part, which air duct has an outlet at a first axial end at which the internal thread is arranged and an inlet at a second end opposite the first axial end, wherein a non-return valve is provided in the region of the inlet, which closes off the air duct in a pressure-tight manner.

7. Tire pressure sensor according to claim 6, wherein an inner projection is provided in the region of the outlet, which projects into the internal thread in order to open a non-return valve provided there when the internal thread is screwed onto the air inlet end of the tire valve.

8. Tire pressure sensor according to claim 6, wherein the receiving part has at least one radial bore which is connected in a manner conducting compressed air to the pressure transducer on the one hand and in a manner conducting compressed air to the air duct on the other hand.

9. Tire pressure sensor according to claim 8, wherein the sleeve part has an outer surface which is opposite an inner surface of the receiving part and along which the receiving part can be rotated in the circumferential direction relative to the axial direction about the sleeve part, wherein the sleeve part has at least one radial bore which opens into the air duct and on the outer surface or in a circumferential groove provided therein.

10. Tire pressure sensor according to claim 9, wherein the at least one radial bore of the receiving part opens on the inner surface or in a circumferential groove provided therein.

11. Tire pressure sensor according to claim 1, wherein the sleeve part has at least one external drive, such as an external hexagon, for the form-fitting engagement of a screwing tool.

12. Tire pressure sensor according to claim 1, wherein the sleeve part has an external thread at its axial end remote from the internal thread for screwing on a valve cap.

13. Arrangement comprising a tire valve and a tire pressure sensor, wherein the tire valve has an air inlet end and an opposite air outlet end arranged to be positioned within a tire cavity, the tire valve has a valve stem, which extends from the air inlet end to the air outlet end and is designed to be inserted through a vehicle rim and held there, wherein the tire pressure sensor is fastened, in particular screwed, to the air inlet end of the tire valve, wherein the tire pressure sensor is designed according to claim 1.

14. Arrangement according to claim 13, wherein the valve stem is formed in a bent manner, in particular with an arc of 70° to 100°.

15. Tire pressure sensor according to claim 2, wherein an electrical energy storage device and a control device are also arranged on or in the receiving part, wherein the control device is supplied with electrical energy from the electrical energy storage device and controls the pressure transducer and the transmitter.

16. Tire pressure sensor according to claim 3, wherein an electrical energy storage device and a control device are also arranged on or in the receiving part, wherein the control device is supplied with electrical energy from the electrical energy storage device and controls the pressure transducer and the transmitter.

17. Tire pressure sensor according to claim 2, wherein the receiving part has at least one interior space in which the pressure transducer and the transmitter and in particular the energy storage device and the control device are positioned completely enclosed by the receiving part.

18. Tire pressure sensor according to claim 3, wherein the receiving part has at least one interior space in which the pressure transducer and the transmitter and in particular the energy storage device and the control device are positioned completely enclosed by the receiving part.

19. Tire pressure sensor according to claim 4, wherein the receiving part has at least one interior space in which the pressure transducer and the transmitter and in particular the energy storage device and the control device are positioned completely enclosed by the receiving part.

20. Tire pressure sensor according to claim 2, wherein the sleeve part has an air duct extending through the sleeve part in the axial direction of the sleeve part, which air duct has an outlet at a first axial end at which the internal thread is arranged and an inlet at a second end opposite the first axial end, wherein a non-return valve is provided in the region of the inlet, which closes off the air duct in a pressure-tight manner.

* * * * *